United States Patent Office 2,893,823
Patented July 7, 1959

2,893,823

SEPARATION OF URANIUM FROM THORIUM

Nison N. Hellman, Peoria, Ill., assignor to the United States of America as represented by the United States Atomic Energy Commission No Drawing. Application January 17, 1950
Serial No. 139,137

9 Claims. (Cl. 23—14.5)

This invention deals with a process for separating uranium from thorium which is particularly applicable to the separation of uranium from mixtures containing the metals in a ratio (thorium to uranium) of over 100 and even of as high as 10,000.

In the recovery of uranium, for instance, from monazite sand, the quantities of uranium are relatively small as compared with those of thorium, the amounts of $U_3O_8$ sometimes being as low as 0.2% while the thorium oxide content is 6.6%.

In the recovery of thorium and uranium from monazite sand and the like by various processes not forming a part of the present invention, mixtures of metal values are obtained with thorium-to-uranium ratios of 100 and greater.

Likewise, the separation of small quantities of uranium from large quantities of thorium is of importance in atomic breeder piles. With the development of the uranium-graphite pile for production of plutonium, fission products, and energy, it was found that an increased utilization of neutrons could be accomplished by the use of a blanket of thorium or a thorium-containing material around the pile. In such a blanket, the thorium isotope, $Th^{232}$, absorbs neutrons to form $Th^{233}$, which decays by $\beta$-emission to $Pa^{233}$. This protactinium isotope decays by $\beta$-emission to $U^{233}$. The half-lives of $Th^{233}$ and $Pa^{233}$ are twenty-three minutes and twenty-seven and four-tenths days, respectively. It is desirable to remove $U^{233}$ from the thorium blanket after decay of $Pa^{233}$, and to purify the thorium for re-use in the blanket.

It is an object of this invention to provide a process by which a satisfactory extraction and a relatively complete separation of uranium may be achieved from large quantities of thorium.

This and other objects are accomplished by converting the thorium-uranium mixture into an aqueous nitrate solution in which the concentration of the thorium nitrate ranges up to 8 N, adding a nitrate salting-out agent, if necessary, to obtain a total nitrate concentration of from 4 to 8 N, and then extracting the uranium by means of an ether. More particularly, the thorium- and uranium-containing mixture is dissolved in nitric acid, and the solution is prepared so as to obtain the desired concentration within the critical range of from 4 to 8 N with regard to the total nitrate due to thorium nitrate, with or without nitric acid and salting-out agent. For instance, a water-soluble nitrate is added as a salting-out agent in an amount sufficient to bring the total nitrate content to a normality of about from 4 to 8. The solution is then thoroughly contacted with an ether whereby uranium is extracted into the organic phase while thorium remains in the aqueous solution. The two phases are then separated whereafter the ingredients may be recovered from their solutions. The uranium, for instance, may be reextracted from the organic phase by means of water.

The concentrations of the thorium nitrate and of the total nitrate in the starting solution are critical because, as was found, if they are too high, i.e., above 8 N, a considerable part of the thorium is extracted by the ether so that the separation is impaired. If the total nitrate concentration is below 4 N, the uranium extraction is unsatisfactory.

All kinds of $NO_3^-$-containing materials may be used as salting-out agents; nitric acid, for instance, has been found operative; furthermore, alkali nitrates, such as ammonium nitrate and lithium nitrate, alkaline earth nitrates, such as magnesium nitrate and calcium nitrate, have been found highly satisfactory. Other nitrates which have been successfully used are manganese nitrate, lanthanum nitrate, aluminum nitrate and copper nitrate. The thorium nitrate obtained when dissolving the thorium-containing material in nitric acid also acts as a salting-out agent by itself so that the addition of other nitrates is not necessary when the thorium nitrate concentration is between 4 and 8 N. It was found that ammonium nitrate, calcium nitrate and magnesium nitrate are the most effective salting-out agents from those listed above and that, when they are used under the conditions of this invention which yield about 25% and usually much higher extraction of uranium, less than 1% thorium is co-extracted by the ether.

A low acid concentration in the aqueous phase is advantageous in order to reduce the degree of co-extraction of thorium and of nitric acid by the ether as much as possible. While the acid concentration may be as high as 4 N, a concentration of 1 N or below is preferred; however, the optimum of the acid concentration has been found to be at a pH of 1.5. A lower acid concentration was found to reduce the extraction of the uranium.

In the following table the results of a number of experiments are compiled which were carried out with various salting-out agents and various nitrate concentrations. Diethyl ether, the preferred ether for the process of this invention, was used in all of these experiments.

Table

| Salting-out agent | Total nitrate, N | Th nitrate, N | Percent U extracted | Percent Th extracted |
|---|---|---|---|---|
| $NH_4NO_3$ | 7 | 1 | 47 | 0.5 |
| | 5 | 1 | 30 | 0.1 |
| | 3 | 1 | 8 | 0.0 |
| $Ca(NO_3)_2$ | 7.50 | 1 | 96 | 1.2 |
| | 5.25 | 1 | 59 | 0.1 |
| | 4.0 | 1 | 25 | 0.0 |
| | 2.75 | 1 | 11 | 0.0 |
| $Mg(NO_3)_2$ | 5.5 | 1 | 99 | 0.31 |
| | 4.14 | 1 | 44 | 0.00 |
| | 2.17 | 1 | 9 | 0.00 |
| $Al(NO_3)_3$ | 5.5 | 1 | 63 | 2.8 |
| $Th(NO_3)_4$ | 9.0 | 8.5 | 58 | 8.0 |
| | 5.0 | 4.5 | 32 | 0.14 |
| | 3.0 | 2.5 | 8 | 0.0 |

In all of these experiments, the procedure consisted of shaking 5 ml. of ether with 5 ml. of aqueous phase of appropriate composition with respect to the nitrates of salting-out agent, thorium and $U^{233}$ tracer. This was done in a glass-stoppered 15-ml. centrifuge cone. After ten minutes' shaking the tubes were centrifuged to effect a clear separation of the layers. A 2-ml. aliquot was then taken from the ether layer, the ether evaporated over water, and the resulting aqueous solution analyzed for thorium and uranium. The thorium analyses were performed by the precipitation of the oxalate with oxalic acid in 1 N hydrochloric acid and the subsequent oxidimetric determination of the oxalate by titration with ceric sulfate. Uranium analyses were made by measuring the $\alpha$-activity of the extracted $U^{233}$. Five to eight thousand counts per minute of tracer (52% counting yield) were used in each experiment. It was found that variation in the amount of tracer from 100 to 100,000 counts per minute in 5-ml. volume did not change the degree of extraction. Nitric acid was present in a concentration of 0.5 N in all experiments.

These expediments show that especially good results are obtained with magnesium nitrate and a total nitrate normality of 5.5. In this instance, a uranium extraction of 99% was obtained while only 0.31% thorium was taken up by the ether phase. Even in the case where thorium nitrate was used as the main salting-out agent, a fair separation was obtained with a total nitrate normality of 5.0, 32% of uranium being extracted and the ether phase containing only 0.14% of thorium.

It will be understood that in order still to increase the efficiency of the process, the extraction cycle may be repeated for any desired number of times. It will also be understood that the process may be carried out in a continuous manner or as a batch process, in countercurrent or cocurrent arrangement. The temperature used for the extraction steps is preferably room temperature, which is about 20° C.

It will also be understood that this invention is not to be limited to the details given herein but that it may be modified within the scope of the appended claims.

What is claimed is:

1. A process for separating uranium from its mixture with thorium in which the ratio of thorium to uranium is at least 100 to 1, comprising dissolving said mixture in nitric acid, adjusting the concentration of total nitrate to from 4 to 8 N, thoroughly contacting said solution with a substantially water-immiscible ether, and separating an ether phase from an aqueous phase.

2. A process for separating uranium from thorium-containing mixtures in which the ratio of uranium to thorium is samller than 1 to 100, comprising dissolving said mixture in nitric acid, adding a nitrate salting-out agent to said solution, adjusting the concentration of said solution so that a total nitrate normality of from 4 to 8 is obtained, thoroughly contacting said solution with a substantially water-immiscable ether, and separating an ether phase from an aqueous phase.

3. The process of claim 2 wherein the salting-out agent is an alkaline earth nitrate.

4. A process for separating uranium from thorium-containing mixtures in which the ratio of uranium to thorium is smaller than 1 to 100, comprising dissolving said mixture in nitric acid, adding a nitrate salting-out agent to said solution, adjusting the concentration of said solution so that a total nitrate normality of from 4 to 8 is obtained, thoroughly contacting said solution with diethyl ether, and separating an ether phase from an aqueous phase.

5. A process for separating uranium from thorium-containing mixtures in which the ratio of uranium to thorium is smaller than 1 to 100, comprising dissolving said mixture in nitric acid, adding an alkaline earth nitrate to said solution, adjusting the concentration of said solution so that a total nitrate normality of from 4 to 8 is obtained, thoroughly contacting said solution with diethyl ether, and separating an ether phase from an aqueous phase.

6. The process of claim 5 wherein the salting-out agent is calcium nitrate.

7. The process of claim 5 wherein the salting-out agent is magnesium nitrate.

8. A process for separating uranium from thorium-containing mixtures in which the ratio of uranium to thorium is smaller than 1 to 100, comprising dissolving said mixture in nitric acid, adding an alkali nitrate to said solution, adjusting the concentration of said solution so that a total nitrate normality of from 4 to 8 is obtained, thoroughly contacting said solution with diethyl ether, and separating an ether phase from an aqeuous phase.

9. The process of claim 8 wherein the salting-out agent is ammonium nitrate.

References Cited in the file of this patent

UNITED STATES PATENTS 2,227,833    Hixson et al. _____ Jan. 7, 1941

OTHER REFERENCES

Misciatelli: "Philosophical Magazine," vol. 7, pp. 670–674 (1929).

Wells: "The Solubility of Some Rare Earth Nitrates in Ether," Journal of the Washington Academy of Sciences, vol. 20, pp. 146–148 (1930).

Dahlman et al.: "Determination of Small Amounts of Uranium," Svensk Kemisk Tidskrift, vol. 61, pp. 204–13 (1949).